United States Patent
Avila et al.

(10) Patent No.: US 11,178,218 B2
(45) Date of Patent: Nov. 16, 2021

(54) BIDIRECTIONAL COMMUNICATION CLUSTERS

(71) Applicant: Citrix Systems, Inc., Fort Lauderdale, FL (US)

(72) Inventors: Gabriel Avila, Pompano Beach, FL (US); Leo C. Singleton, IV, Fort Lauderdale, FL (US)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 16/238,056

(22) Filed: Jan. 2, 2019

(65) Prior Publication Data

US 2020/0213387 A1    Jul. 2, 2020

(51) Int. Cl.
  *H04L 29/08* (2006.01)
  *H04L 29/06* (2006.01)

(52) U.S. Cl.
  CPC .......... *H04L 67/1002* (2013.01); *H04L 67/02* (2013.01); *H04L 67/42* (2013.01)

(58) Field of Classification Search
  CPC ...... H04L 67/1002; H04L 67/02; H04L 67/42
  USPC .......................................................... 709/203
  See application file for complete search history.

(56) References Cited

U.S. PATENT DOCUMENTS

| | | | | |
|---|---|---|---|---|
| 10,193,963 B2* | 1/2019 | Gummaraju | .......... | G06F 16/182 |
| 10,594,553 B2* | 3/2020 | Marsh | ............ | H04L 41/0896 |
| 10,756,968 B2* | 8/2020 | Johnson | ............ | H04L 41/0893 |
| 2011/0231652 A1* | 9/2011 | Bollay | .......... | H04L 63/306 |
| | | | | 713/153 |
| 2012/0297069 A1* | 11/2012 | Duchastel | .......... | G06F 9/45533 |
| | | | | 709/226 |
| 2015/0040122 A1* | 2/2015 | Singleton, IV | ..... | G06F 9/45558 |
| | | | | 718/1 |
| 2016/0330177 A1* | 11/2016 | Singleton, IV | ....... | G06F 21/554 |
| 2017/0034127 A1* | 2/2017 | Singleton, IV | ..... | H04L 61/2503 |
| 2017/0230287 A1 | 8/2017 | Hall et al. | | |
| 2017/0339563 A1* | 11/2017 | Singleton, IV | ..... | G06F 16/9566 |
| 2018/0331918 A1* | 11/2018 | Woodmansee | .......... | H04L 67/08 |

OTHER PUBLICATIONS

Wikipedia contributors, "SignalR," Wikipedia, the Free Encyclopedia, pp. 1-2, https://en.wikipedia.org/wiki/SignalR (accessed Apr. 2, 2019).
Wikipedia contributors, "Redis," Wikipedia, the Free Encyclopedia, pp. 1-7, https://en.wikipedia.org/wiki/Redis (accessed Apr. 2, 2019).
Wikipedia contributors, "WebSocket," Wikipedia, the Free Encyclopedia, pp. 1-4, https://en.wikipedia.org/wiki/WebSocket (accessed Apr. 2, 2019).

(Continued)

*Primary Examiner* — Tauqir Hussain
(74) *Attorney, Agent, or Firm* — Banner & Witcoff, Ltd.

(57) ABSTRACT

Methods and systems for providing bidirectional communications between client devices and server devices are described herein. Server devices in a cluster may bidirectionally communicate with client devices in a resource site via direct connections or virtual connections. One or more server devices may act as intermediate server devices for communications via virtual connections, and may distinguish different types of messages based on header contents of the messages.

20 Claims, 11 Drawing Sheets

(56) References Cited

OTHER PUBLICATIONS

Mike Wasson, "SignalR Scaleout with Redis," Jun. 9, 2014, Microsoft Docs, pp. 1-11, https://docs.microsoft.com/en-us/aspnet/signalr/overview/performance/scaleout-with-redis (accessed Apr. 2, 2019).

Andrew Stanton-Nurse et al., "Set up a Redis backplane for ASP.NET Core SignalR scale-out," Nov. 27, 2018, Microsoft Docs, pp. 1-5, https://docs.microsoft.com/en-us/aspnet/core/signalr/redis-backplane?view=aspnetcore-2.2 (accessed Apr. 2, 2019).

Mike Wasson et al., "Introduction to Scaleout in SignalR," Jun. 9, 2014, Microsoft Docs, pp. 1-6, https://docs.microsoft.com/en-us/aspnet/signalr/overview/performance/scaleout-in-signalr (accessed Apr. 2, 2019).

Daniel D'agostino, "SignalR Scaleout with Redis Backplane," Sep. 14, 2015, DZone Database, pp. 1-6, https://dzone.com/articles/signalr-scaleout-with-redis-backplane (accessed Apr. 2, 2019).

\* cited by examiner

BIDIRECTIONAL COMMUNICATION CLUSTERS

FIELD

Aspects described herein generally relate to computer and network hardware and software. More particularly, aspects of the present disclosure relate to methods and systems for providing bidirectional communications between client devices and server devices.

BACKGROUND

Enterprises are increasingly adopting cloud computing services, which may provide various resources (e.g., applications and/or desktops) as a service to users. Users may access the resources via user devices. The resources may be hosted by client devices located in on-premises and/or cloud resource sites. Computing devices in communication with the client devices (e.g., computing devices implementing one or more control plane functions for managing the client devices) may be located in a different area (e.g., a different network) from the client devices.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

Methods and systems for improving the performance and/or scalability of the communications between the client devices and the computing devices may be developed. Examples described herein are directed towards a system, an apparatus, and/or computer readable media configured to perform a method for providing bidirectional communications between client devices and server devices. A first computing device, of a cluster of computing devices, may establish bidirectional connections with other computing devices of the cluster of computing devices. The first computing device may establish a bidirectional connection with a client device to form a virtual connection between the client device and a second computing device of the cluster of computing devices, wherein the virtual connection allows bidirectional communication between the client device and the second computing device via the first computing device. The first computing device may receive, from the client device, a message comprising a header that includes forwarding flag data and destination connection data. The first computing device may send, based on the forwarding flag data and the destination connection data, the message to the second computing device.

In some examples, based on determining that the forwarding flag data indicates a forwarding flag, the first computing device may determine, based on the destination connection data, a connection to the second computing device. The first computing device may update the forwarding flag data with a non-forwarding flag. The non-forwarding flag may indicate, to the second computing device, processing a payload of the message. The first computing device may send the message, via the connection, to the second computing device.

In some examples, the first computing device may receive, from the client device, a second message comprising a second header that includes second forwarding flag data. Based on determining that the second forwarding flag data indicates a non-forwarding flag, the first computing device may process a payload of the second message. In some examples, the first computing device may determine, based on a connection database table, that a second client device is directly connected to the first computing device via a second bidirectional connection. The first computing device may send, to the second client device and via the second bidirectional connection, a second message.

In some examples, the first computing device may determine, based on a connection database table, that a second client device is connected to the first computing device via a virtual connection comprising a third computing device of the cluster of computing devices. The first computing device may populate forwarding flag data of a second message with a forwarding flag. The first computing device may populate destination connection data of the second message with a connection between the third computing device and the second client device. The first computing device may send, to the third computing device, the second message.

In some examples, the first computing device may store a connection database table indicating a plurality of virtual connections to a plurality of client devices directly connected to the other computing devices. In some examples, a content switcher may receive, from the client device, a connection request indicating an identifier associated with the client device. The content switcher route, based on the identifier, the connection request to the cluster of computing devices. The establishing the bidirectional connection with the client device may be based on the connection request.

In some examples, based on the establishing the bidirectional connection with the client device, the first computing device may update the client device with information associated with virtual connections to the other computing devices. The first computing device may update the other computing devices with information associated with a virtual connection to the client device. In some examples, each of the bidirectional connection with the client device and the bidirectional connections with the other computing devices may comprise one of a WebSocket connection, a HTTP persistent connection, or a Comet connection.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
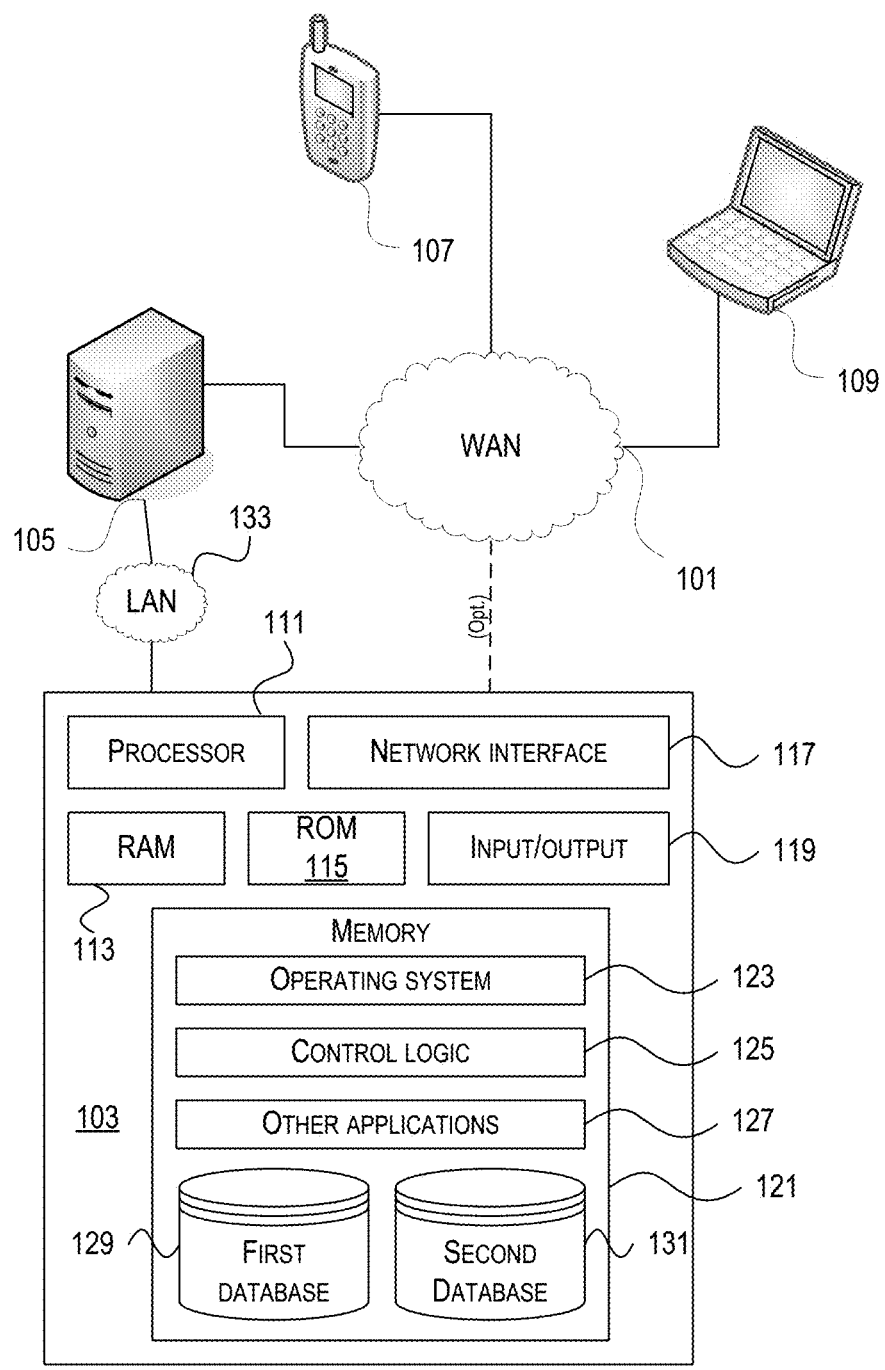
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards providing bidirectional communications between client devices (e.g., physical computing devices, or virtual machines, configured to host virtual applications and/or virtual desktops) and server devices (e.g., configured to implement control plane functions for managing the client devices) are described herein. Server devices in a cluster may bidirectionally communicate with client devices in a resource site via direct connections or virtual connections. Direct connections may be configured to deliver messages between server devices and client devices without other server devices acting as intermediaries. Virtual connections may be configured to deliver messages between server devices and client devices via other server devices acting as intermediaries. Server devices may distinguish different types of messages (e.g., sent via direct connections or virtual connections) based on the header contents of the messages, and may accordingly keep the messages or forward the messages.

To perform various control plane functions for managing the client devices in a resource site, each of the server devices in a cluster corresponding to the resource site may be configured to establish bidirectional connections with all of the client devices. The total number of bidirectional connections between the server devices and the client devices may, for example, correspond to the total number of the server devices multiplied by the total number of the client devices. If the number of the client devices increases, and the number of corresponding server devices increases as well (e.g., to handle the additional load of the client devices), the total number of bidirectional connections between the server devices and the client devices may become very large, and may contribute to higher consumption of resources (e.g., networking resources). Additionally or alternatively, the scalability of the system may be impeded (e.g., networking resources of a server device may impose a limit on the total number of bidirectional connections it may establish).

Configuring virtual connections between server devices and client devices may help alleviate these challenges. Each of the client devices in a resource site may establish a bidirectional connection with one server device in the cluster corresponding to the resource site. The server devices in the cluster may form a mesh network (e.g., establishing bidirectional connections with each other). A client device in the resource site may bidirectionally communicate with a server device in the cluster via a direct connection between the client device and the server device. Additionally or alternatively, a client device in the resource site may bidirectionally communicate with a server device in the cluster via a virtual connection comprising another server device, in the cluster, acting as an intermediary and configured to forward messages from the client device to the server device or from the server device to the client device. Configuring a client device with a direct bidirectional connection with one server device in a cluster and virtual connection(s) with other server device(s) in the cluster may reduce resource consumption and/or facilitate the scalability of the system. For example, a client device might only need to establish a bidirectional connection with one server device. Resource consumption may be reduced as the total number of bidirectional connections between client devices and server devices may be reduced. The system may be able to scale as the number of bidirectional connections each server device has may be reduced.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected," "coupled," and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network,"

which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
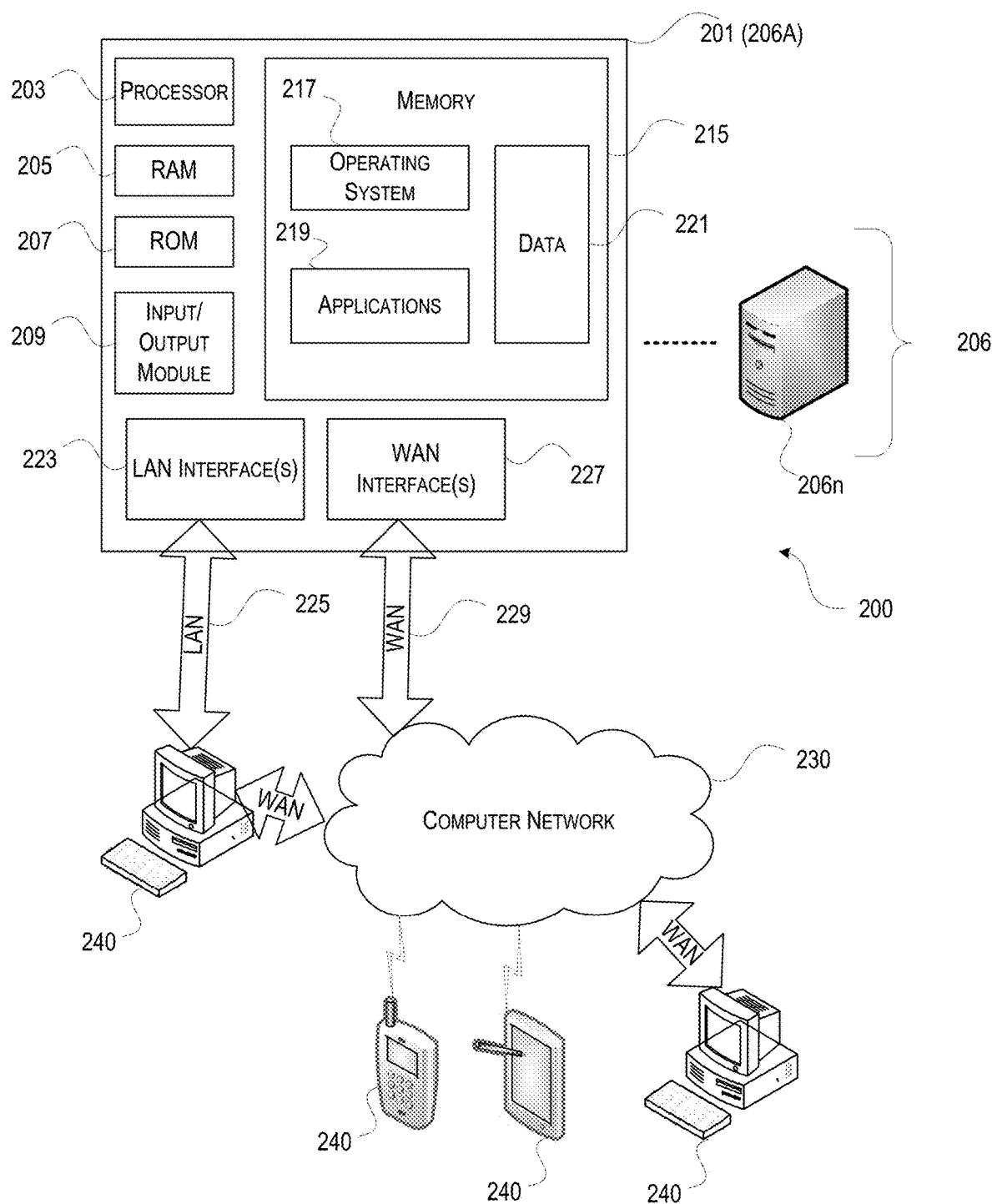
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
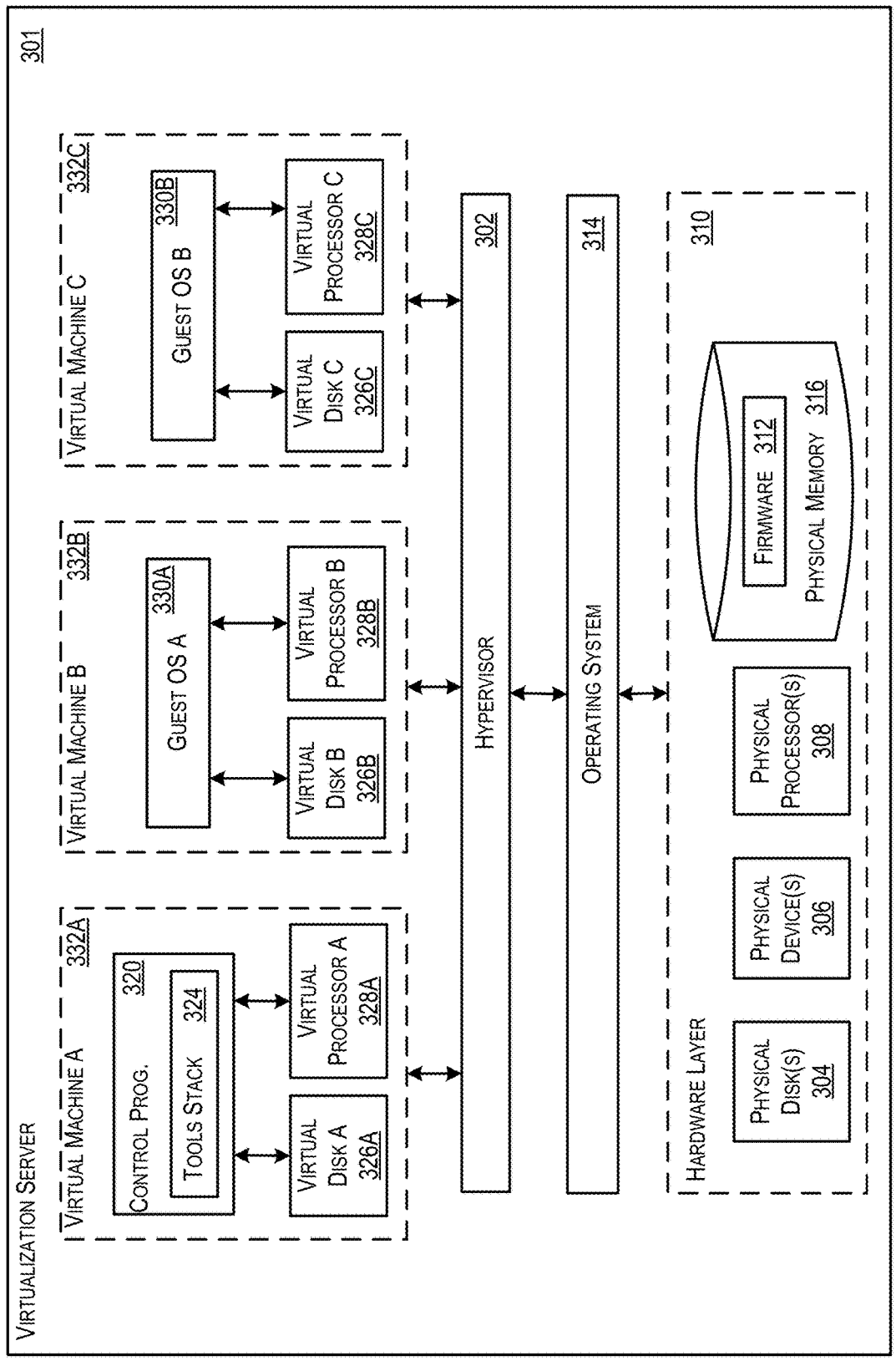
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; the XENPROJECT hypervisor, an open source product whose development is overseen by the open source XenProject.org community; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the XENSERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
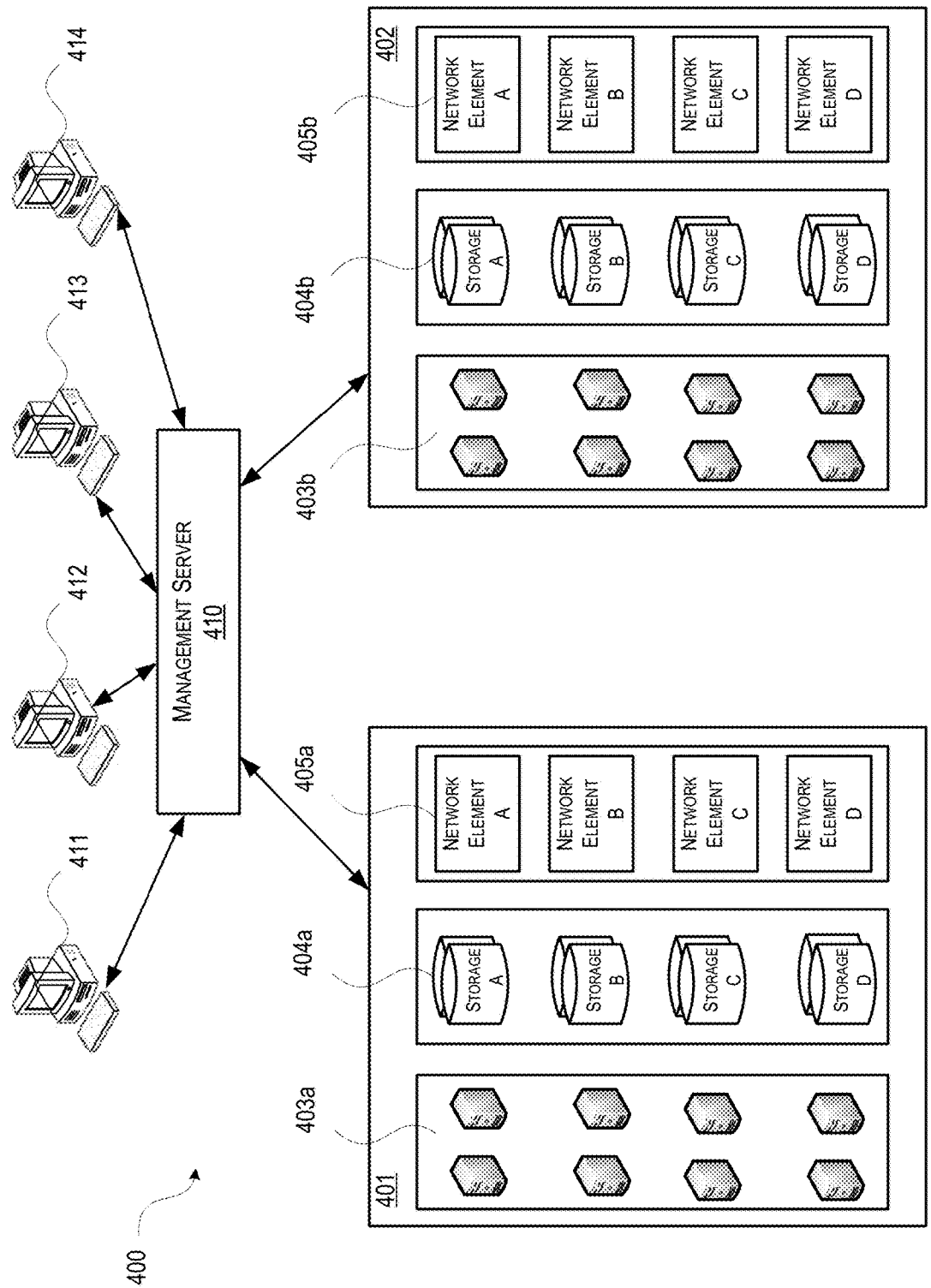
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, CLOUDPLATFORM or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Bidirectional Communication Clusters

Figure 5:
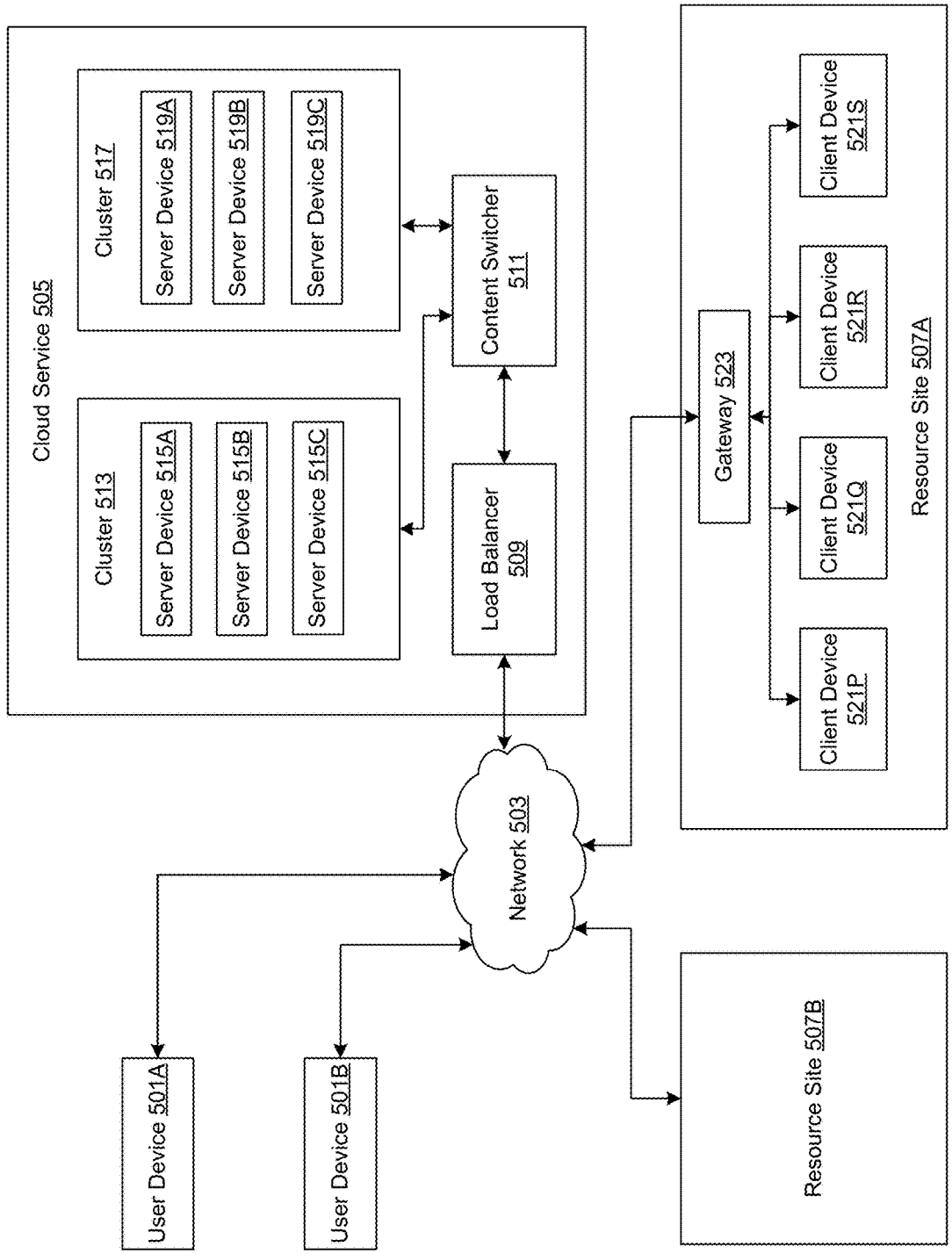
FIG. 5 is a schematic diagram showing an example system for providing bidirectional communications between client devices and server devices.

FIG. 5 is a schematic diagram showing an example system for providing bidirectional communications between client devices and server devices. The system may include one or more user devices (e.g., user devices 501A, 501B), one or more networks (e.g., network 503), one or more cloud services (e.g., cloud service 505), and one or more resource sites (e.g., resource sites 507A, 507B). The user devices 501A, 501B may include, for example, a smartphone, personal computer, tablet, desktop computer, laptop computer, gaming device, virtual reality headset, or any other computing device having an interface to communicate with the network 503. Additionally, the user devices 501A, 501B may include, for example, the computers 107, 109, the terminals 240, or the client computers 411-414 as discussed above in connection with FIGS. 1, 2, and 4.

The network 503 may include one or more of any of various types of information distribution networks, such as, without limitation, a satellite network, a telephone network, a cellular network, a Wi-Fi network, an Ethernet network, an optical fiber network, a coaxial cable network, a hybrid fiber coax network, etc. The network 503 may include an Internet Protocol (IP) based network (e.g., the Internet) or other types of networks. The network 503 may include, for example, the wide area network 101, the local area network 133, or the computer network 230. The network 503 may use a plurality of interconnected communication links to connect the user devices 501A, 501B, the cloud service 505, and the resource sites 507A, 507B. For example, the user devices 501A, 501B may access, via the network 503, the cloud service 505 and the resource sites 507A, 507B.

The cloud service 505 and the resource sites 507A, 507B may provide services (e.g., virtual applications, virtual desktops, etc.) to the user devices 501A, 501B. For example, the cloud service 505 and the resource sites 507A, 507B may implement application virtualization software and/or desktop virtualization software for providing virtual applications and/or virtual desktops. The resource sites 507A, 507B may comprise, for example, locations of computing resources for hosting virtual applications and/or virtual desktops to be provided to users. Each of the resource sites 507A, 507B may include one or more client devices, which may be configured to host virtual applications and/or virtual desktops. For example, the resource site 507A may include client devices 521P-521S. There may be additional or alternative client devices in the resource sites 507A, 507B. The client devices 521P-521S may comprise a physical computing device (e.g., the data server 103, the web server 105, the server 206, etc.). Additionally or alternatively, the client devices 521P-521S may comprise a virtual machine. For example, the resource site 507A may include the virtualization server 301, and the client devices 521P-521S may include the virtual machines 332A-332C.

The resource sites (e.g., the resource sites 507A, 507B) may be associated with various user groups (e.g., customers of the cloud service 505). For example, a customer of the cloud service 505 may have a resource site (e.g., the resource site 507A or 507B) including physical computing devices located on the customer's premises. As another example, a customer of the cloud service 505 may rent virtual machines from a cloud vendor, and may organize the virtual machines into a resource site (e.g., the resource site 507A or 507B) on the cloud vendor's cloud. The client devices in a resource site may be connected to the network 503. For example, for security purposes and/or other purposes, the client devices 521P-521S may communicate with the network 503 (e.g., the public Internet) via a gateway (e.g., gateway 523). The gateway 523 may comprise, for example, any type of computing device configured to filter traffic coming into the private network, and/or may shield the client devices 521P-521S from malicious traffic from the public Internet. In addition, the client devices 521P-521S may communicate with each other via a private network of the resource site 507A.

The resource sites (e.g., the resource sites 507A, 507B) may be associated with various user groups (e.g., customers of the cloud service 505). A user group may include one or more users, which may access (e.g., via their user devices) virtual applications and/or virtual desktops running on the client devices in the user group's resource site. For example, a user group (e.g., a private organization) may have the resource site 507A on-premises, and a user (e.g., an employee) of the user group may use the user device 501A to access virtual applications and/or virtual desktops running on the client devices 521P-521S in resource site 507A.

The cloud service 505 may implement one or more control plane functions for managing client devices in resource sites. For example, the cloud service 505 may receive, from user devices (e.g., the user devices 501A, 501B), requests to access virtual applications and/or virtual desktops of the resource sites 507A, 507B. In turn, the cloud service 505 may assign the requests to client devices in resource sites, and may facilitate the user devices to connect to the requested virtual applications and/or virtual desktops running on the client devices. As another example, the cloud service 505 may monitor the running status (e.g., Central Processing Unit (CPU) usage rate, memory usage rate, etc.) of client devices in resource sites, and may provide the monitored information to the user groups (e.g., customers) associated with the resource sites (e.g., to the administrators of the user groups).

The cloud service 505 may include one or more load balancers (e.g., load balancer 509), one or more content switchers (e.g., content switcher 511), and one or more clusters (e.g., clusters 513, 517). The clusters 513, 517 may include one or more server devices. For example, the cluster 513 may include server devices 515A-515C, and the cluster 517 may include server devices 519A-519C. There may be additional or alternative server devices in the clusters 513, 517. The control plane functions for managing client devices in resource sites may be implemented on the server devices 515A-515C, 519A-519C. The server devices 515A-515C, 519A-519C may include a physical computing device or a virtual machine. In some examples, the server devices 515A-515C, 519A-519C may be located at different geographical regions to provide a distributed architecture for the clusters 513, 517. For example, the cloud service 505 may comprise one or more hypervisors, which may automatically provision in the clusters or remove from the clusters virtual machines as server devices based on the load on, and the capacity of, the server devices.

To manage the resource sites 507A, 507B corresponding to various user groups, the server devices in the cloud service 505 may be organized into clusters (e.g., the cluster 513, 517). Each cluster 513, 517 may have one or more server devices. One or more user groups may be assigned to a cluster (e.g., such that the cluster may be responsible for handling incoming messages associated with the one or more user groups). The load balancer 509 and the content switcher 511 may be configured to route incoming messages (e.g., from the user devices 501A, 501B or the resources sites 507A, 507B) to the corresponding clusters. The content switcher 511 may comprise one or more content switches (e.g., implemented on one or more computing devices). The load balancer 509 may balance the load of incoming messages among the content switches. For example, the load balancer 509 may route incoming messages to the content switches in such a manner that the content switches may be evenly used. The content switches may route the messages to their corresponding clusters based on the user group information of the messages (e.g., as indicated in the headers of the messages). For example, a content switch may route a message generated by a user device used by a user of a particular user group to a cluster to which the particular user group is assigned.

The server devices in a cluster may communicate with the client devices in the resource site(s) corresponding to the cluster to manage the client devices (e.g., assigning user requests to access virtual applications to the client devices, gathering running status data of the client devices, etc.). Bidirectional connections may be used to improve the performance of communications between client devices and server devices (e.g., when the client devices are located within a private network). A bidirectional connection may comprise any type of communication link configured to allow devices connected thereby to communicate bidirectionally. A bidirectional connection may include, for example, a WebSocket connection, a HTTP persistent connection, a Comet connection, or any other type of connection providing a full-duplex interactive communication session between a client and a server. A bidirectional connection may, for example, enable a server device to send (e.g., push) data to a client device without the client device first sending a request for the data.

For example, if the client device 521P is located within a private network of the resource site 507A, and a bidirectional connection is not established between the client device 521P and a server device in a corresponding cluster, the server device might not be able to send data to the client device 521P if the client device 521P does not first send a request for the data. For example, the gateway 523 may filter out any traffic initiated by a computing device outside of the private network and/or not requested by a client device within the private network (e.g., for security purposes and/or other purposes). By establishing a bidirectional connection (e.g., a WebSocket connection) between the client device 521P and the server device, the server device may be able to push data (e.g., associated with assigning a user request to access a virtual application and/or virtual desktop, requesting running status data from the client device 521P, etc.) to the client device 521P without the client device 521P first sending a request for the data.

Figure 6:
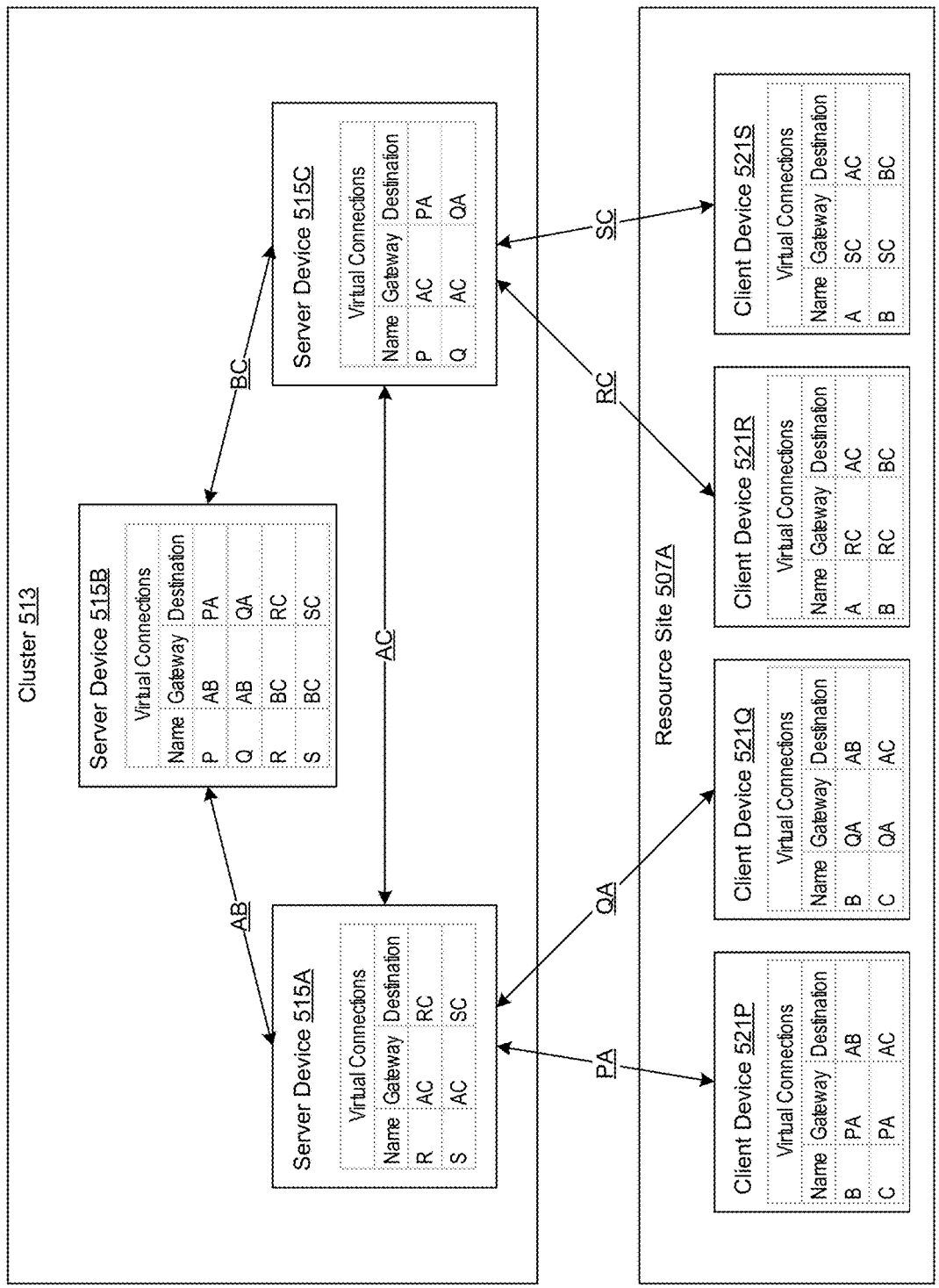
FIG. 6 is a schematic diagram showing an example system for configuring virtual connections.

FIG. 6 is a schematic diagram showing an example system for configuring virtual connections. The example system may include the cluster 513 (including the server devices 515A-515C) and the resource site 507A (including the client devices 521P-521S). The server devices 515A-515C may form a mesh network. For example, the server devices 515A-515C may establish bidirectional connections with each other (e.g., as indicated by communication links AB, AC, BC). Additionally or alternatively, the server devices 515A-515C may be connected with each other (e.g., using dedicated network adapters) in the server devices 515A-515C, and/or may form the mesh network on a separate subnet, for increased performance. For example, each of the server devices 515A-515C may have a dedicated network adapter (e.g., a physical network adapter or a virtual network adapter) for communicating with each other, and may use a separate network adapter for communicating with devices outside of the cluster 513 (e.g., the client devices 521P-521S), so that traffic to or from the devices outside the cluster 513 might not take the resources of the dedicated network adapters for internal cluster communications.

Each of the client devices 521P-521S may establish a bidirectional connection (e.g., a WebSocket connection) with one of the server devices 515A-515C. For example, the client device 521P may establish a bidirectional connection with the server device 515A (as indicated by a communication link PA). The client device 521Q may establish a bidirectional connection with the server device 515A (as indicated by a communication link QA). The client device 521R may establish a bidirectional connection with the server device 515C (as indicated by a communication link RC). The client device 521S may establish a bidirectional connection with the server device 515C (as indicated by a communication link SC). The client devices 521P-521S may communicate with the server devices 515A-515C via the direct connections. For example, the client device 521P may communicate with the server device 515A via the communication link PA. Each of the client devices 521P-521S and/or the server devices 515A-515C may store a connection database table configured to store its direct connections with other devices. The connection database table may comprise any type of desired storage system, such as an ORACLE Database, MySQL, MICROSOFT SQL Server, IBM DB2, etc. For example, a record for a direct connection in a connection database table of a first device (e.g., a server device or a client device) may include a name data field and a connection data field. The name data field may store an identifier of a second device (e.g., a server device or a client device) directly connected to the first device. The connection data field may store an identifier of the connection between the first device and the second device.

Additionally, the client devices 521P-521S and the server devices 515A-515C may create virtual connections with each other, so that a first device may communicate with a second device not directly connected to the first device. For example, the client device 521P may create a virtual connection, with the server device 515B, that includes the server device 515A acting as an intermediate (e.g., gateway) server device. The virtual connection may comprise, for example, a combination of the bidirectional connection PA and the bidirectional connection AB. The server device 515A may be directly connected to the client device 521P, and may be directly connected to the server device 515B. The server device 515A may forward messages from the client device 521P to the server device 515B. The client device 521P may create, in its connection database table, a record indicating the virtual connection to the server device 515B. For example, the record for a virtual connection may include a name data field, a gateway connection data field, and a destination connection data field. The name data field may store an identifier of the virtually connected device. The gateway connection data field may store an identifier of the connection between the source device and the intermediate server device. The destination connection data field may store an identifier of the connection between the intermediate server device and the virtually connected device. In some examples, the destination connection data field of a record, for a virtual connection, stored by a device (e.g., a server device or client device) may be used by the device to identify the virtual connection. As shown in FIG. 6, the client devices 521P-521S and the server devices 515A-515C may store one or more virtual connection records. More details regarding generating and/or storing the virtual connection records are further discussed in connection with FIGS. 7-8.

A mesh network may be formed among server devices in a cluster (e.g., the server devices 515A-515C). As an example, in the mesh network (e.g., a fully mesh network or a fully connected network), each server device may be connected to each of the other server devices. A client device might only need to connect to one of the server devices in a cluster, to communicate with all of the server devices. The one server device may receive messages directed to itself from the client device. The one server device may also receive messages directed to the other server devices from the client device, and may forward the messages to the other server devices via one additional hop. This network arrangement may facilitate greater efficiency, scalability, and flow of information for the system. Additionally or alternatively, server devices in a cluster (e.g., the server devices 515A-515C) may form a partial mesh network, a star network, a tree network, a ring network, a line network, or any other desired network topology. A client device may communicate with its directly connected server device, and may communicate with another server device in the cluster via one or more server devices acting as intermediaries.

If a source device (e.g., a client device of the client devices 521P-521S or a server device of the server devices 515A-515C) sends a message to a destination device (e.g., a server device of the server devices 515A-515C or a client device of the client devices 521P-521S), the source device may determine whether the destination device is directly connected to the source device or virtually connected to the source device, and may configure the message to be sent accordingly. For example, if the client device 521P is to send a message to the server device 515A, the client device 521P may determine that the server device 515A is directly connected to the client device 521P (e.g., based on a connection database table of the client device 521P). For example, the connection database table of the client device 521P may indicate a list of devices connected to it and whether their corresponding connections are direct or virtual connections. The client device 521P may send the message to the server device 515A via that direct connection.

If the client device 521P is to send a message to the server device 515B, the client device 521P may determine that the server device 515B is not directly connected to the client device 521P (e.g., based on the connection database table of the client device 521P). The client device 521P may search its connection database table for the virtual connection record associated with the server device 515B, may update the message to indicate that the message is to be forwarded by an intermediate server device (e.g., the server device 515A) to the server device 515B, and may send the message to the intermediate server device for forwarding to the server device 515B. More details regarding communications between client devices and server devices are further discussed in connection with FIGS. 9-10.

Figure 7:
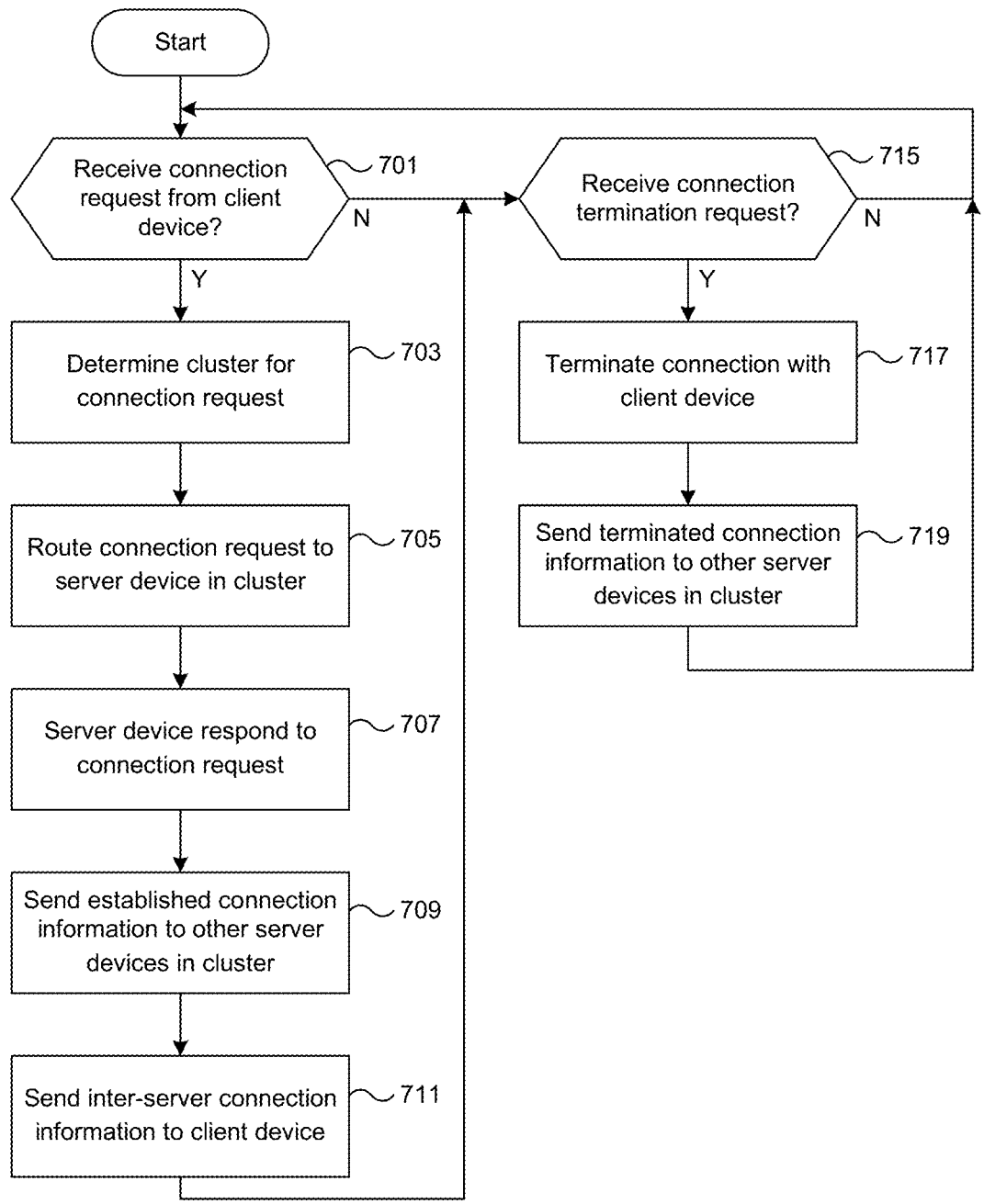
FIG. 7 is a flowchart showing an example method for configuring bidirectional connections between client devices and server devices.

FIG. 7 is a flowchart showing an example method for configuring bidirectional connections between client devices and server devices. The example method may be performed, for example, by the system as described in connection with FIGS. 5-6. The steps of the example method are described as being performed by particular computing devices for the sake of simplicity, but the steps may be performed by any other computing device.

In step 701, a computing device (e.g., the load balancer 509) may determine whether a request to establish a bidirectional connection is received from a client device (e.g., the client device 521P). The connection request may include, for example, a WebSocket handshake request, a HTTP persistent connection request, a Comet connection request, or other types of bidirectional connection requests. A client device may send a connection request to the cloud service 505, for example, if the client device comes online (e.g., the client device is powered on, provisioned by a hypervisor, etc.). The connection request may, for example, indicate the Uniform Resource Identifier (URI) of the cloud service 505.

If a connection request is received from a client device (step 701: Y), the method may proceed to step 703. In step 703, the computing device may determine a cluster of server devices and/or a particular server device in the cluster to which to assign the connection request. For example, the load balancer 509 may receive the connection request, and may forward the connection request to a content switch (e.g., running on a particular server) of the content switcher 511. The load balancer 509 may choose the content switch to which to forward the connection request in such a manner that the load of incoming messages may be evenly distributed among the content switches of the content switcher 511.

A content switch may receive the connection request, and may route the connection request to a server device in a cluster based on the user group information indicated in the connection request. For example, when sending the connection request, the client device may include, in the header of the connection request, an identifier of the user group associated with the client device. The content switch may receive the connection request, and may inspect the header of the connection request to determine the user group identifier. The content switch may determine, based on the user group identifier, a cluster of server devices that are responsible for the user group. For example, the content switch may store a mapping of user group identifier to server cluster, and may determine, based on the mapping, the cluster for sending the connection request. The content switch may send the connection request to the determined cluster.

Additionally, the content switch may select, from the determined cluster, a server device to which to send the connection request. The content switch may select a server device in such a manner that connection requests routed to the cluster may be evenly distributed among the server devices in the cluster. For example, the content switch may use a round-robin algorithm to select the server device. The content switch may order the server devices, and may put the ordered server devices in a circular list. The content switch may sequentially select, from the circular list, server devices for assigning connection requests. Additionally or alternatively, the content switch may select a server device in such a manner that the server devices in the cluster may have substantially similar numbers of direct connections with client devices. For example, the content switch may monitor the number of direct connections that each of the server devices in the cluster may have with client devices, and may select a server device that may have a smaller or same number of direct connections as compared to other server devices in the cluster.

In step 705, the computing device (e.g., the content switch) may route the connection request to the selected server device in the determined cluster. The server device may receive the connection request, and may process the connection request. In step 707, the server device may respond to the connection request. For example, the server device may accept the connection request, and may establish a bidirectional connection with the client device. The server device may generate an identifier for the established bidirectional connection (e.g., based on the connection request). The identifier may include a globally unique identifier (GUID). The server device may send, to the client device, a response indicating that the bidirectional connection has been established (e.g., a WebSocket handshake response). The response may also indicate the identifier of the established bidirectional connection. Additionally, the server device may update its connection database table to indicate the established bidirectional connection. For example, the server device may create a record in its connection database table to indicate that the client device is directly connected to the server device.

In step 709, the server device may send, to other server devices in the cluster, messages indicating the established bidirectional connection. For example, the server device may inform the other server devices of the identifier of the established bidirectional connection, the identifier of the server device, and/or the identifier of the client device. The other server devices that receive the information may use the information to create virtual connections to the client device. For example, one of the other server devices may create, in its connection database table, a new record indicating the virtual connection to the client device. The name data field of the new record may indicate the identifier of the client device. The gateway connection data field of the new record may indicate the identifier of the bidirectional connection between the server device and the one of the other server devices. The destination connection data field of the new record may indicate the identifier of the established bidirectional connection between the server device and the client device. The one of the other server devices may use the virtual connection to communicate with the client device.

In step 711, the server device may send, to the client device, one or more messages indicating the existing bidirectional connections between the server device and other server devices in the cluster. For example, the server device may inform the client device of the identifiers of the existing bidirectional connections between the server device and the other server devices, the identifier of the server device, and/or the identifiers of the other server devices corresponding to the existing bidirectional connections. The client device may use the information to generate virtual connections to the other server devices in the cluster, in a similar manner as discussed in connection with step 709.

If a connection request is not received from a client device (step 701: N), the method may proceed to step 715. In step 715, a server device (e.g., the server device 515A) may determine whether a request to terminate a bidirectional connection with a client device is received. The connection termination request may be received from a client device (e.g., if the client device comes offline, is powered off, etc.) or from another computing device (e.g., a computing device that manages the power of client devices). Additionally or alternatively, the server device may generate an instruction to terminate a bidirectional connection with a client device, for example, if the server device does not have enough resources to support the bidirectional connection.

If a connection termination request is not received (step 715: N), the method may go back to step 701. Otherwise (step 715: Y), the method may proceed to step 717. In step 717, the server device may terminate the bidirectional connection with the client device. For example, the server device may send, to the client device, a message indicating the termination of the bidirectional connection. The server device (and/or the client device) may release resources (e.g., computing resources, networking resources such as the underlying Transmission Control Protocol (TCP) connection for a WebSocket connection, etc.) used for the bidirectional connection. The server device (and/or the client device) may update its connection database table for the termination (e.g., removing records associated with the terminated connection from its connection database table).

In step 719, the server device may send, to other server devices in the cluster, messages indicating the terminated connection. The other server devices may receive the information, and may update their connection database tables accordingly. For example, one of the other server devices may remove, from its connection database table, a record associated with the terminated connection. The other server devices might not attempt to communicate with the client device via virtual connections if the bidirectional connection between the server device and the client device is terminated.

Figure 8:
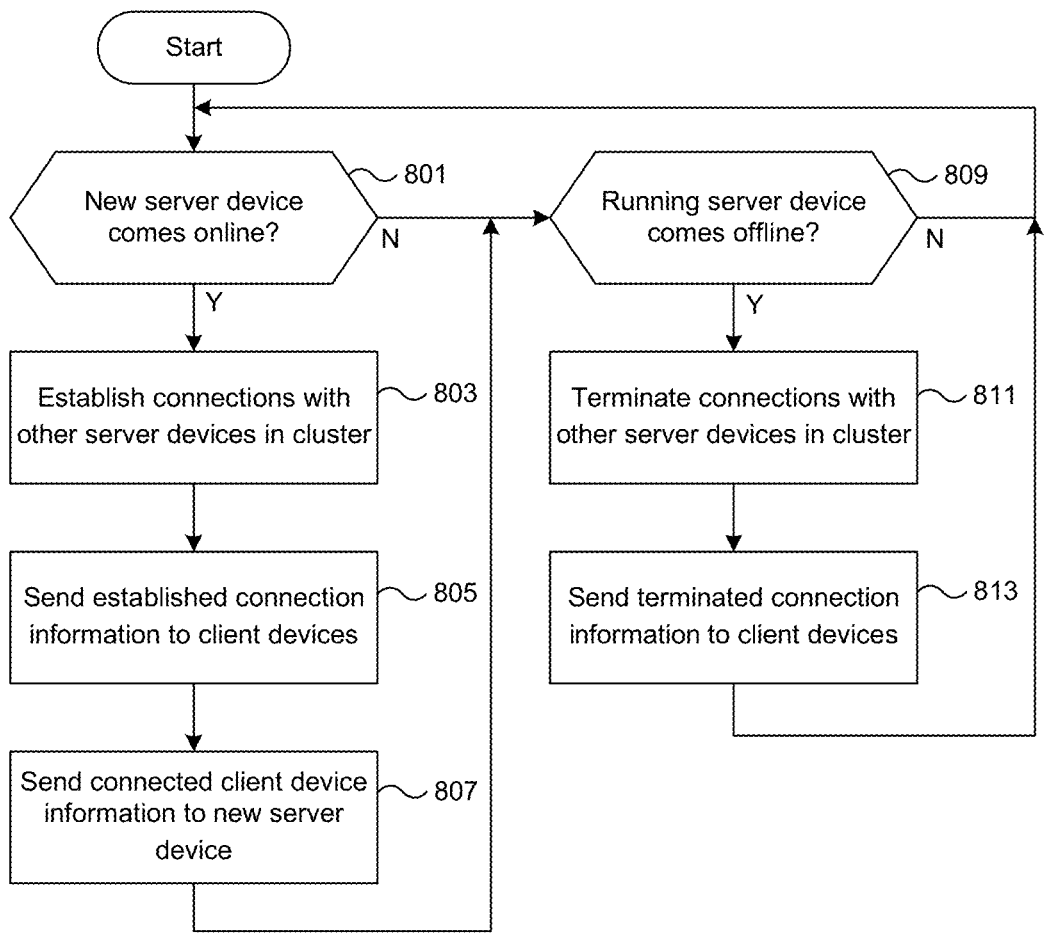
FIG. 8 is a flowchart showing an example method for configuring bidirectional connections among server devices.

FIG. 8 is a flowchart showing an example method for configuring bidirectional connections among server devices. The example method may be performed, for example, by the system as described in connection with FIGS. 5-6. The steps of the example method are described as being performed by particular computing devices for the sake of simplicity, but the steps may be performed by any other computing device.

In step 801, a determination may be made (e.g., by the cloud service 505) whether a new server device comes online in a cluster (e.g., powered on, connected to the cluster network, etc.). For example, hypervisors of the cloud service 505 may provision new virtual machines as server devices in a cluster (e.g., to satisfy the load of the cluster). As another example, the cloud service 505 may be configured to power on a physical computing device as a server device in a cluster (e.g., to satisfy the load of the cluster).

If a new server device comes online in a cluster (step 801: Y), the method may proceed to step 803. In step 803, the new server device may establish communication links (e.g., bidirectional connections) with other server devices in the cluster. As an example, the new server device may establish a bidirectional connection with each of the other server devices in the cluster, so that a mesh network may be formed among the server devices. For example, in the mesh network, each server device may be connected to each of the other server devices. In order to communicate with all of the server devices in a cluster, a client device might only need to connect to one of the server devices. The one server device may receive messages directed to itself from the client device. The one server device may also receive messages directed to the other server devices from the client device, and forward the messages to the other server devices via one additional hop. This network arrangement may facilitate greater efficiency, scalability, and flow of information for the system.

For example, when a server device comes online in a cluster, it may be assigned an identifier (e.g., by the cloud service 505). For example, the new server device may be assigned a random value as its identifier. Additionally or alternatively, a list of server device identifiers may be maintained, and an available identifier from the list may be assigned to the new server device.

The new server device may receive a list of server device identifiers corresponding to other running server devices in the cluster. The new server device, as a client, may connect to the other server devices in the cluster whose identifiers have lower (or higher) values than the new server device's identifier. For example, the new server device may send, to these server devices with lower (or higher) identifier values, WebSocket handshake requests. These server devices may accept the WebSocket handshake requests, and may respond with WebSocket handshake responses.

The new server device, as a server, may connect to the other server devices in the cluster whose identifiers have higher (or lower) values than the new server device's identifier. For example, these server devices with higher (or lower) identifier values may send, to the new server device, WebSocket handshake requests within a period of time after the new server comes online. Additionally or alternatively, the new server device may send notifications to these server devices. For example, the new server device may send, to these server devices, WebSocket handshake requests (as notifications). These server devices may receive the WebSocket handshake requests, and may return rejections to the new server device. These server devices, as clients, may then send, to the new server device, WebSocket handshake requests to establish bidirectional connections with the new server device. The server devices in the cluster may follow the example steps discussed above to form a network (e.g., a mesh network). The cluster may automatically perform the self-maintenance as server devices are brought up and/or taken down (e.g., so that the network arrangement may be maintained for features described herein).

In step 805, the server devices in the cluster may send, to the client devices connected to the cluster, messages indicating the established connections between the new server device and the other server devices. The client devices may use the information to generate virtual connections to the new server device in the cluster, in a similar manner as discussed in connection with step 709. In step 807, the other server devices in the cluster may send, to the new server device, messages indicating the connections between the other server devices and the client devices. The new server device may use the information to generate virtual connections to the client devices, in a similar manner as discussed in connection with step 709.

If there is no new server device coming online in a cluster (step 801: N), the method may proceed to step 809. In step 809, a determination may be made whether a running server device in a cluster comes offline. If there is no running server device coming offline in a cluster (step 809: N), the method may go back to step 801. If a running server device comes offline (step 809: Y), the method may proceed to step 811. In step 811, connections between the server device coming offline and other server devices in the cluster may be terminated. For example, when a server device comes offline, the server device may send, to the other server devices in the cluster, requests to terminate the connections between the server device and the other server devices. Each of the other server devices may mark as terminated its connection with the server device coming offline. For example, each of the other server devices may remove, from the list of active connections in its connection database table, its connection with the server device coming offline. Additionally or alternatively, each of the other server devices may remove, from its connection database table, records of virtual connections associated with the server device coming offline (e.g., virtual connections to client devices directly connected to the server device coming offline).

In step 813, each of the other server devices in the cluster may send, to the client devices directly connected to it, messages indicating that its connection with the server device coming offline has been terminated. The client devices may receive the messages, and may adjust their connection database tables accordingly. For example, the client devices may remove, from their connection database tables, the virtual connections to the server device coming offline.

Figure 9:
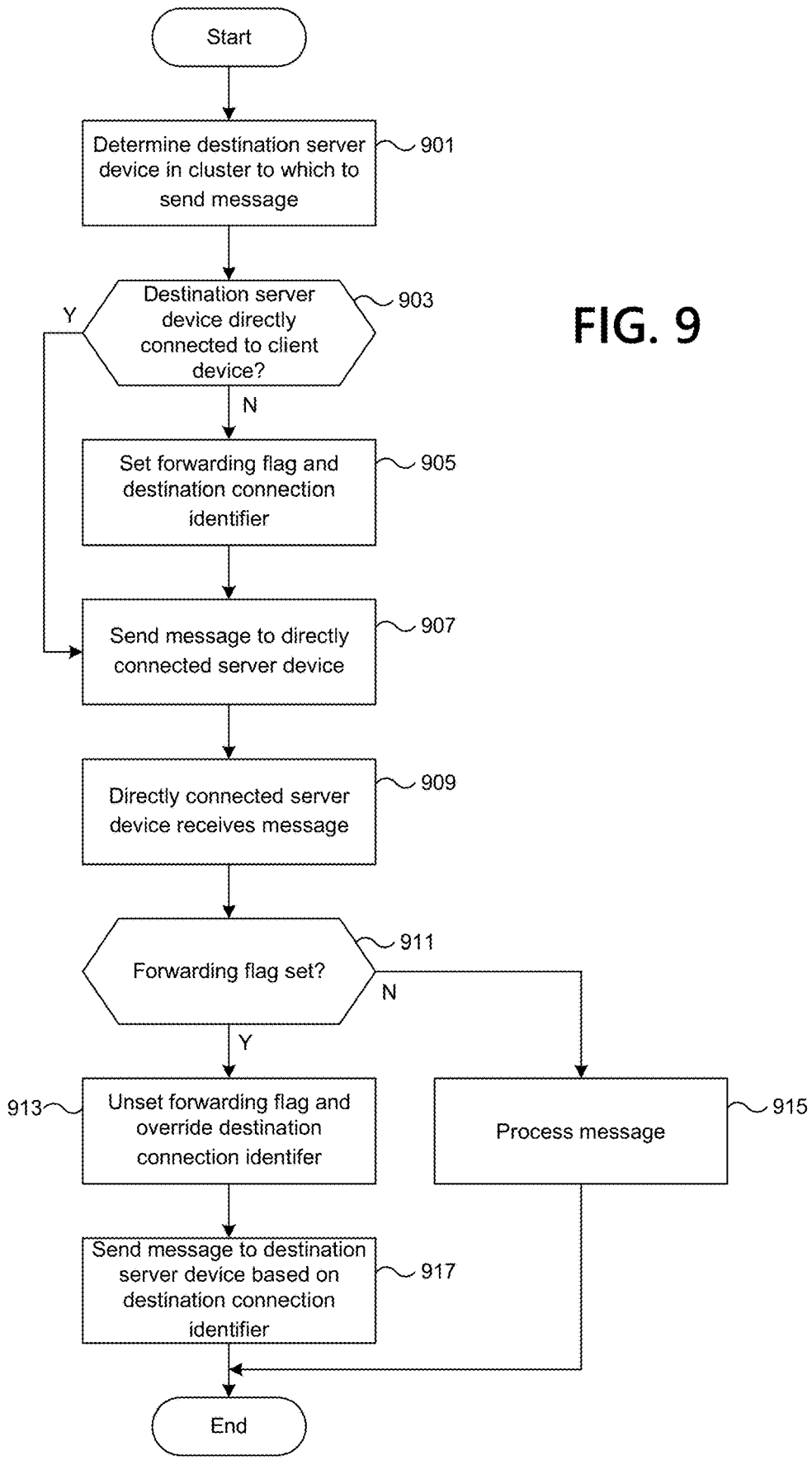
FIG. 9 is a flowchart showing an example method for communicating between client devices and server devices.

FIG. 9 is a flowchart showing an example method for communicating between client devices and server devices. The example method may be performed, for example, by the system as described in connection with FIGS. 5-6. The steps of the example method are described as being performed by particular computing devices for the sake of simplicity, but the steps may be performed by any other computing device.

In step 901, a client device (e.g., the client device 521P) may determine a server device, in the cluster associated with the client device (e.g., the cluster 513), as the destination to which to send one or more messages. For example, the client device may determine to send (e.g., periodically) running status data (e.g., the client device's current CPU usage rate, memory usage rate, etc.) to a particular server device (e.g., a server device configured to gather running status data and to provide the data to users) in the cluster. In step 903, the client device may determine whether the destination server device is directly connected to the client device. For example, the client device may have sent to the cloud service 505 a connection request, and may have established a direct connection with a server device in the cluster to which the client device is assigned. The client device may store a record of the direct connection in its connection database table. Additionally or alternatively, after the client device establishes the direct connection with the server device, the client device may receive, from the server device, messages indicating connections between the server device and other server devices in the cluster. The client device may generate, based on the messages, virtual connections with the other server devices, and may store, in its connection database table, records of the virtual connections (e.g., in a similar manner as discussed in connection with step 711 of FIG. 7).

If the destination server device is directly connected to the client device (step 903: Y), the method may proceed to step 907. In step 907, the client device may send, to the destination server device and via the direct connection between the client device and the destination server device, one or more messages (e.g., messages indicating running status data). The one or more messages might not include a forwarding flag data field and/or a destination connection data field. Additionally or alternatively, the one or more messages may include a forwarding flag data field (e.g., indicating a non-forwarding flag) and a destination connection data field (e.g., indicating an identifier of the direct connection). If the destination server device is not directly connected to the client device (step 903: N), the method may proceed to step 905. In step 905, the client device may set the forwarding flag and destination connection identifier for the message to be sent to the destination server device. The message may include or may be updated to include a forwarding flag data field and a destination connection data field. The forwarding flag data field may be used to indicate that the device receiving the message may forward the message. The destination connection data field may be used to indicate the connection via which the device receiving the message may forward the message.

The client device may configure the forwarding flag data field of the message with a forwarding flag. The client device may search its connection database table to determine the virtual connection to the destination server device, and may determine the identifier of the connection between the server device directly connected to the client device and the destination server device. The client device may configure the destination connection data field of the message with the identifier of the connection. In step 907, the client device may send the message to the server device directly connected to the client device. In this situation, the server device directly connected to the client device may act as an intermediate server device configured to forward the message to the destination server device.

In step 909, the server device that is directly connected to the client device may receive the message from the client device. In step 911, the directly connected server device may determine whether the received message indicates a forwarding flag (e.g., based on the forwarding flag data field of the message). If the received message does not indicate a forwarding flag (and/or if the message indicates a non-forwarding flag) (step 911: N), the method may proceed to step 915. In step 915, the directly connected server device may further process the received message. For example, the directly connected server device may execute instructions indicated in the message, may store information indicated in the message (e.g., the payload of the message) in the directly connected server device, etc. The directly connected server device may determine that the message was originated from a client device directly connected to it (e.g., based on determining that the message does not include a destination connection data field, based on determining that a destination connection data field of the message indicates a direct connection of the directly connected server device, etc.). The directly connected server device may determine the identity of the client device from which the message was originated, for example, by identifying a direct connection record, in the connection database table of the directly connected server device, whose connection data field indicates the direct connection identifier (e.g., as indicated in the message). The directly connected server device may use the identity of the client device for future communications (e.g., associated with the message).

If the received message indicates a forwarding flag (step 911: Y), the method may proceed to step 913. In step 913, the directly connected server device may unset the forwarding flag of the message. For example, the directly connected server device may update the forwarding flag data field of the message with a non-forwarding flag, or may remove the forwarding flag data field from the header of the message. The directly connected server device may extract (e.g., read, parse, etc.) the destination connection identifier from the message, and may override the destination connection identifier in the message with an origin connection identifier. The origin connection identifier may comprise an identifier of the connection between the client device and the directly connected server device.

In step 917, the directly connected server device may send the message to the destination server device based on the extracted destination connection identifier. In some examples, the forwarding of the message might not involve the directly connected server device inspecting or parsing the payload of the message. The computing overhead generated by the forwarding mechanism may be reduced to inspecting and/or updating the header content of the message. The destination server device may receive the message, and may inspect the header content of the message. The header content of the message may indicate that the message is not to be forwarded by the destination server device, and may indicate the origin connection identifier. The destination server device may determine that the message was sent via a virtual connection (e.g., based on determining that the origin connection identifier does not correspond to a direct connection of the destination server device). The destination server device may determine, based on the origin connection identifier, the virtual connection via which the message was sent, and/or the identity of the client device from which the message was originated (e.g., by identifying a virtual connection record, in the connection database table of the destination server device, whose destination connection data field indicates the origin connection identifier). The destination server device may use the identity of the client device for future communications (e.g., associated with the message).

Figure 10:
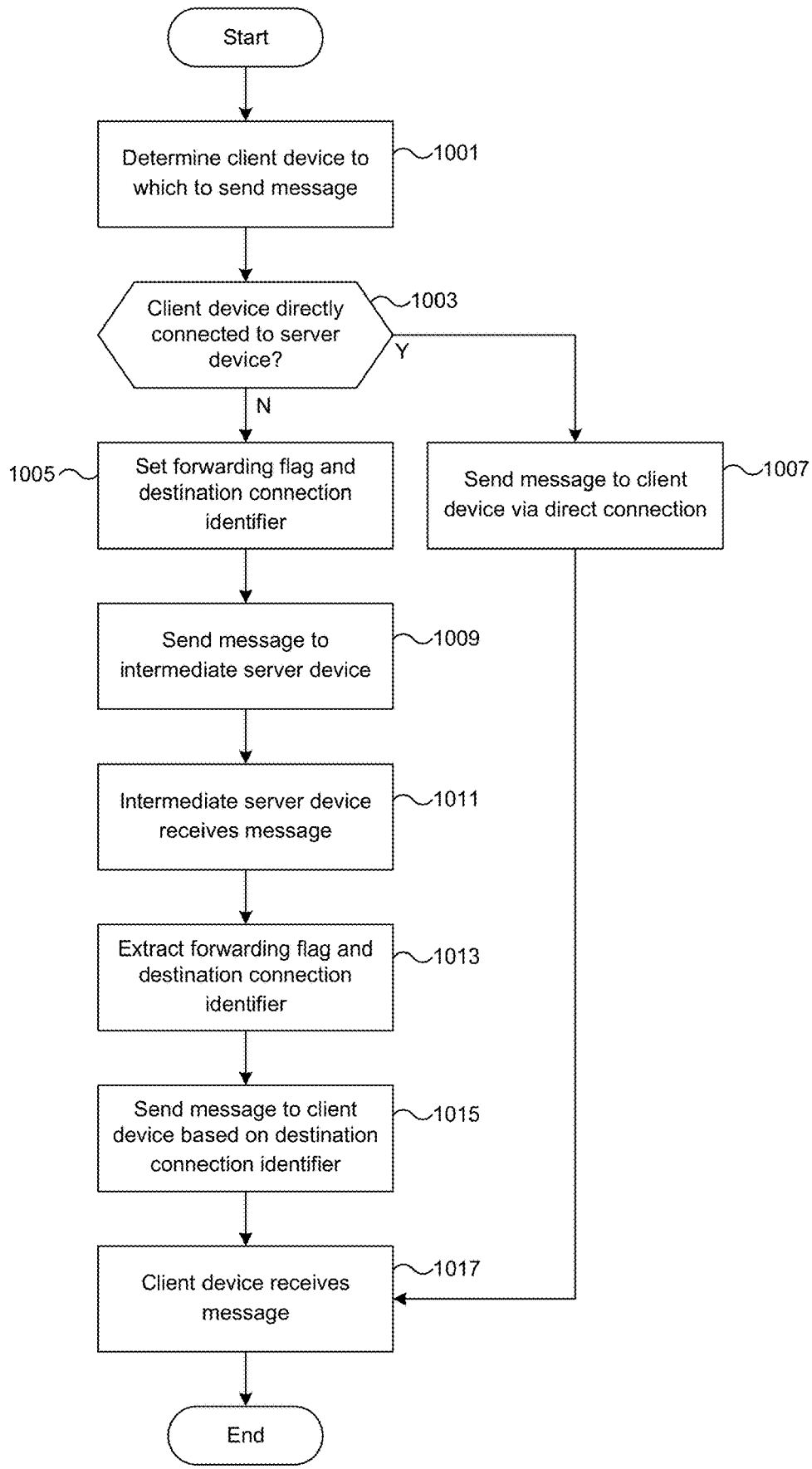
FIG. 10 is a flowchart showing an example method for communicating between server devices and client devices.

FIG. 10 is a flowchart showing an example method for communicating between server devices and client devices. The example method may be performed, for example, by the system as described in connection with FIGS. 5-6. The steps of the example method are described as being performed by particular computing devices for the sake of simplicity, but the steps may be performed by any other computing device.

In step 1001, a first server device (e.g., the server device 515A) may determine a client device to which to send a message. For example, the first server device may send, to a particular client device, a remote procedure call (RPC) message. As another example, the first server device may send, to a particular client device, a request for running status data of the client device.

In step 1003, the first server device may determine whether the client device is directly connected to the first server device. For example, the first server device may store a list of client devices that are directly connected to the first server device, and may determine whether the client device as determined in step 1001 is included in the list. If the client device is directly connected to the first server device (step 1003: Y), the method may proceed to step 1007. In step 1007, the first server device may send the message to the client device via the direct connection between the first server device and the client device. For example, the first server device may send, to the client device and via the direct connection, a request for running status data of the client device. The message might not include a forwarding flag data field and/or a destination connection data field. Additionally or alternatively, the message may include a forwarding flag data field (e.g., indicating a non-forwarding flag) and a destination connection data field (e.g., indicating an identifier of the direct connection).

In step 1017, the client device may receive the message. The client device may determine that the message is not to be forwarded by the client device (e.g., based on determining that the message does not include a forwarding flag data field, or based on determining that the message indicates a non-forwarding flag). The client device may determine that the message was originated from a server device directly connected to it (e.g., based on determining that the message does not include a destination connection data field, based on determining that a destination connection data field of the message indicates a direct connection of the client device, etc.). The client device may determine the identity of the server device from which the message was originated, for example, by identifying a direct connection record, in the connection database table of the client device, whose connection data field indicates the direct connection identifier (e.g., as indicated in the message). The client device may use the identity of server device for future communications (e.g., associated with the message).

If the client device is not directly connected to the first server device (step 1003: N), the method may proceed to step 1005. In step 1005, the first server device may set the forwarding flag and destination connection identifier for the message to be sent to the client device. For example, the first server device may update a forwarding flag data field of the message with a forwarding flag. The first server device may search its connection database table to determine the virtual connection to the client device, and may determine the identifier of a connection between a server device directly connected to the client device and the client device. The first server device may update a destination connection data field of the message with the identifier of that connection.

In step 1009, the first server device may send the message to the server device directly connected to the client device. The server device directly connected to the client device may act as an intermediate server device configured to forward the message to the client device. In step 1011, the server device directly connected to the client device (acting as the intermediate server device) may receive the message. In step 1013, the intermediate server device may extract the forwarding flag from the forwarding flag data field of the message, and may extract the destination connection identifier from the destination connection data field of the message. The forwarding flag may indicate, to the intermediate server device, that the message is to be forwarded. Additionally or alternatively, the intermediate server device may unset the forwarding flag of the message (e.g., updating the forwarding flag data field of the message with a non-forwarding flag or removing the forwarding flag data field from the header of the message), and may override the destination connection identifier in the message with an origin connection identifier. The origin connection identifier may comprise an identifier of a connection between the first server device and the intermediate server device.

In step 1015, the intermediate server device may determine the connection to the client device based on the destination connection identifier, and may send the message to the client device via the connection. In step 1017, the client device may receive the message. For example, the message may comprise a request, from the first server device, for running status data of the client device, and/or any other type of message. Additionally or alternatively, the receipt of the message by the client device from the first server device may confirm that the bidirectional communication channel between the first server device and the client device has been established. The client device may inspect the header content of the message. The header content of the message may indicate that the message is not to be forwarded by the client device, and may indicate the origin connection identifier. The client device may determine that the message was sent via a virtual connection (e.g., based on determining that the origin connection identifier does not correspond to a direct connection of the client device). The client device may determine, based on the origin connection identifier, the virtual connection via which the message was sent, and/or the identity of the server device from which the message was originated (e.g., by identifying a virtual connection record, in the connection database table of the client device, whose destination connection data field indicates the origin connection identifier). The client device may use the identity of server device for future communications (e.g., associated with the message).

Figure 11:
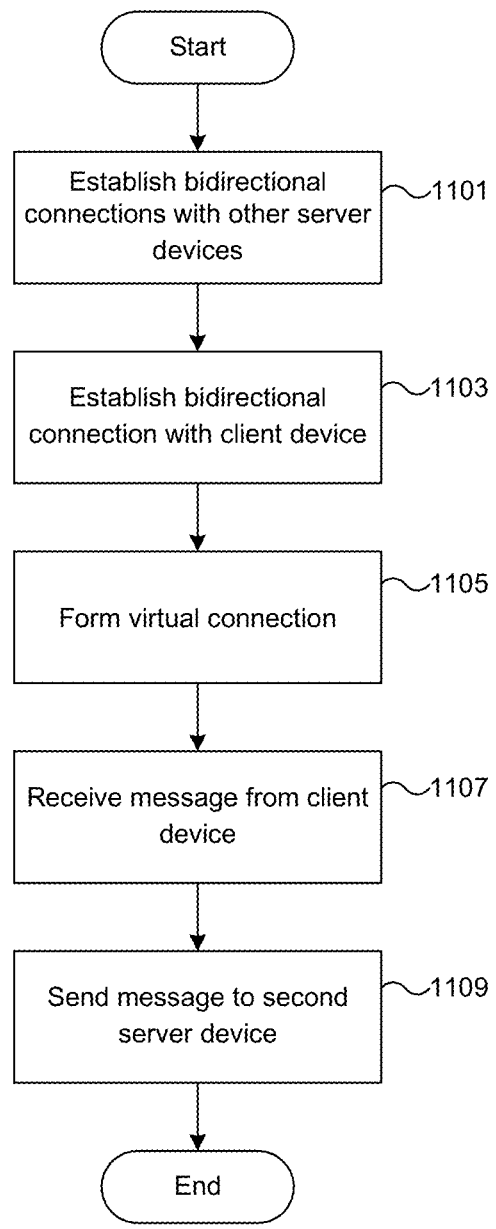
FIG. 11 is a flowchart showing an example method for providing bidirectional communications between server devices and client devices.

FIG. 11 is a flowchart showing an example method for providing bidirectional communications between server devices and client devices. In step 1101, a first server device, of a cluster of server devices, comprising one or more processors and memory may establish bidirectional connections with other server devices of the cluster of server devices. In step 1103, the first server device may establish a bidirectional connection with a client device. In step 1105, the first server device may form a virtual connection between the client device and a second server device of the cluster of server devices. The virtual connection may allow bidirectional communication between the client device and the second server device via the first server device. In step 1107, the first server device may receive, from the client device, a message comprising a header that includes forwarding flag data and destination connection data. In step 1109, the first server device may send, based on the forwarding flag data and the destination connection data, the message to the second server device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
  establishing, by a first server device, a mesh network among a cluster of server devices;
  establishing, by the first server device, a bidirectional connection with a first client device within a private network to form a virtual connection between the first client device and a second server device of the cluster of server devices, wherein the virtual connection allows bidirectional communication between the first client device and the second server device via the first server device, wherein a bidirectional connection between a second client device within the private network and the second server device is established, and wherein the bidirectional connection between the second client device and the second server device is independent of the first server device;
  receiving, from the first client device, a first message comprising a header that includes forwarding flag data and destination connection data;
  sending, by the first server device and based on the forwarding flag data and the destination connection data, the first message to the second server device;
  determining, based on a connection database table, that the second client device is connected to the first server device via a virtual connection based on the second server device;
  populating forwarding flag data of a second message with a forwarding flag;
  populating destination connection data of the second message with the bidirectional connection between the second client device and the second server device; and
  sending, by the first server device and to the second server device, the second message.

2. The method of claim 1, wherein the sending the first message to the second server device comprises:
  based on determining that the forwarding flag data of the first message indicates a forwarding flag, determining, based on the destination connection data of the first message, a particular connection to the second server device;
  updating the forwarding flag data of the first message with a non-forwarding flag, wherein the non-forwarding flag indicates, to the second server device, processing a payload of the first message; and
  sending the first message, via the particular connection, to the second server device.

3. The method of claim 1, further comprising:
  receiving, by the first server device and from the first client device, a third message comprising a header that includes forwarding flag data; and
  based on determining that the forwarding flag data of the third message indicates a non-forwarding flag, processing a payload of the third message.

4. The method of claim 1, further comprising:
  determining, based on the connection database table, that the first client device is directly connected to the first server device via the bidirectional connection with the first client device; and
  sending, by the first server device, to the first client device, and via the bidirectional connection with the first client device, a third message.

5. The method of claim 1, further comprising:
  storing, by the first server device, the connection database table, wherein the connection database table indicates a plurality of virtual connections to a plurality of client devices directly connected to other server devices of the cluster of server devices.

6. The method of claim 1, further comprising:
  receiving, by a content switcher and from the first client device, a connection request indicating an identifier associated with the first client device; and
  routing, by the content switcher and based on the identifier, the connection request to the cluster of server devices;
  wherein the establishing the bidirectional connection with the first client device is based on the connection request.

7. The method of claim 1, further comprising based on the establishing the bidirectional connection with the first client device:
  updating the first client device with information associated with virtual connections to server devices of the cluster of server devices; and
  updating server devices of the cluster of server devices with information associated with a virtual connection to the first client device.

8. The method of claim 1, wherein each of the bidirectional connection with the first client device and the bidirectional connection between the second client device and the second server device comprises one of a WebSocket connection, a HTTP persistent connection, or a Comet connection.

9. A first computing device comprising:
  one or more processors; and memory storing instructions that, when executed by the one or more processors, cause the first computing device to:
  establish a mesh network among a cluster of computing devices;
  establish a bidirectional connection with a first client device within a private network to form a virtual connection between the first client device and a second computing device of the cluster of computing devices, wherein the virtual connection allows bidirectional communication between the first client device and the second computing device via the first computing device, wherein a bidirectional connection between a second client device within the private network and the second computing device is established, and wherein the bidirectional connection between the second client device and the second computing device is independent of the first computing device;
  receive, from the first client device, a first message comprising a header that includes forwarding flag data and destination connection data;
  send, based on the forwarding flag data and the destination connection data, the first message to the second computing device;
  determine, based on a connection database table, that the second client device is connected to the first computing device via a virtual connection based on the second computing device;
  populate forwarding flag data of a second message with a forwarding flag;
  populate destination connection data of the second message with the bidirectional connection between the second client device and the second computing device; and
  send, to the second computing device, the second message.

10. The first computing device of claim 9, wherein the instructions, when executed by the one or more processors, cause the first computing device to send the first message to the second computing device by:
  based on determining that the forwarding flag data of the first message indicates a forwarding flag, determining, based on the destination connection data of the first message, a particular connection to the second computing device;
  updating the forwarding flag data of the first message with a non-forwarding flag, wherein the non-forwarding flag indicates, to the second computing device, processing a payload of the first message; and
  sending the first message, via the particular connection, to the second computing device.

11. The first computing device of claim 9, wherein the instructions, when executed by the one or more processors, further cause the first computing device to:
  receive, from the first client device, a third message comprising a header that includes forwarding flag data; and
  based on determining that the forwarding flag data of the third message indicates a non-forwarding flag, process a payload of the third message.

12. The first computing device of claim 9, wherein the instructions, when executed by the one or more processors, further cause the first computing device to:
  determine, based on the connection database table, that the first client device is directly connected to the first computing device via the bidirectional connection with the first client device; and
  send, to the first client device and via the bidirectional connection with the first client device, a third message.

13. The first computing device of claim 9, wherein the instructions, when executed by the one or more processors, further cause the first computing device to:
  store the connection database table, wherein the connection database table indicates a plurality of virtual connections to a plurality of client devices directly connected to other computing devices of the cluster of computing devices.

14. One or more non-transitory computer readable media storing computer readable instructions that, when executed, cause a first computing device to:
  establish a mesh network among a cluster of computing devices;
  establish a bidirectional connection with a first client device within a private network to form a virtual connection between the first client device and a second computing device of the cluster of computing devices, wherein the virtual connection allows bidirectional communication between the first client device and the second computing device via the first computing device, wherein a bidirectional connection between a second client device within the private network and the second computing device is established, and wherein the bidirectional connection between the second client device and the second computing device is independent of the first computing device;
  receive, from the first client device, a first message comprising a header that includes forwarding flag data and destination connection data;
  send, based on the forwarding flag data and the destination connection data, the first message to the second computing device;
  determine, based on a connection database table, that the second client device is connected to the first computing device via a virtual connection based on the second computing device;
  populate forwarding flag data of a second message with a forwarding flag;
  populate destination connection data of the second message with the bidirectional connection between the second client device and the second computing device; and
  send, to the second computing device, the second message.

15. The one or more non-transitory computer readable media of claim 14, wherein the computer readable instructions, when executed, cause the first computing device to send the first message to the second computing device by:
  based on determining that the forwarding flag data of the first message indicates a forwarding flag, determining, based on the destination connection data of the first message, a particular connection to the second computing device;
  update the forwarding flag data of the first message with a non-forwarding flag, wherein the non-forwarding flag indicates, to the second computing device, processing a payload of the first message; and
  send the first message, via the particular connection, to the second computing device.

16. The method of claim 1, wherein the establishing the mesh network comprises the first server device making connections to other server devices of the cluster with lower identification numbers and receiving requests to connect to other server devices of the cluster with higher identification numbers, connections between the first server device and all other server devices of the cluster of server devices being bidirectional connections, and the bidirectional connections being persistent connections.

17. The method of claim 1, wherein the first server device and the second server device are outside of the private network.

18. The method of claim 1, wherein the private network comprises a gateway, wherein the bidirectional connection established by the first server device with the first client device is via the gateway, and wherein the bidirectional connection between the second client device and the second server device is via the gateway.

19. The first computing device of claim 9, wherein each of the bidirectional connection with the first client device and the bidirectional connection between the second client device and the second computing device comprises one of a WebSocket connection, a HTTP persistent connection, or a Comet connection.

20. The one or more non-transitory computer readable media of claim 14, wherein each of the bidirectional connection with the first client device and the bidirectional connection between the second client device and the second computing device comprises one of a WebSocket connection, a HTTP persistent connection, or a Comet connection.

* * * * *